(12) United States Patent
Dhong et al.

(10) Patent No.: US 7,962,811 B2
(45) Date of Patent: Jun. 14, 2011

(54) SCAN CHAIN DISABLE FUNCTION FOR POWER SAVING

(75) Inventors: Sang Hoo Dhong, Austin, TX (US); Joel Abraham Silberman, Somers, NY (US); Osamu Takahashi, Round Rock, TX (US); James Douglas Warnock, Somers, NY (US); Dieter Wendel, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 11/552,807

(22) Filed: Oct. 25, 2006

(65) Prior Publication Data

US 2007/0061647 A1    Mar. 15, 2007

Related U.S. Application Data

(62) Division of application No. 10/976,259, filed on Oct. 28, 2004, now Pat. No. 7,165,006.

(51) Int. Cl.
  *G01R 31/28*  (2006.01)
  *G01R 27/28*  (2006.01)
  *G01R 31/00*  (2006.01)
  *G01R 31/14*  (2006.01)
(52) U.S. Cl. ......... 714/726; 714/727; 714/729; 702/120
(58) Field of Classification Search .................. None
  See application file for complete search history.

(56) References Cited

U.S. PATENT DOCUMENTS

| 5,719,878 | A | * | 2/1998 | Yu et al. ........................ 714/726 |
| 6,114,892 | A | | 9/2000 | Jin |
| 6,191,603 | B1 | * | 2/2001 | Muradali et al. .............. 324/765 |
| 6,271,700 | B1 | * | 8/2001 | Itaya .............................. 327/202 |
| 6,397,301 | B1 | | 5/2002 | Quach et al. |
| 6,665,828 | B1 | | 12/2003 | Arimilli et al. |
| 6,680,622 | B2 | * | 1/2004 | Zounes ........................... 326/16 |
| 6,681,356 | B1 | | 1/2004 | Gerowitz et al. |
| 7,000,163 | B1 | * | 2/2006 | Dirks et al. ..................... 714/727 |
| 2003/0214318 | A1 | * | 11/2003 | Zounes ........................... 326/16 |
| 2004/0117705 | A1 | * | 6/2004 | Zounes ........................ 714/726 |
| 2004/0210807 | A1 | * | 10/2004 | Sweet et al. .................. 714/725 |

* cited by examiner

*Primary Examiner* — Jeffrey A Gaffin
*Assistant Examiner* — Guerrier Merant
(74) *Attorney, Agent, or Firm* — Stephen J. Walder, Jr.; Matthew B. Talpia

(57) ABSTRACT

An apparatus, a method and a computer program product are provided for conserving energy during functional mode of a processor by disabling the scan chain. By inserting logic gating into the scan chain it is possible to disable the scan chain during the processor's functional mode. During functional mode the scan out port of the latch bit in a scan chain toggles, which leads to unnecessary energy consumption. By gating scan control signals and the scan out port of a latch bit, the scan chain segment between latch bits can be disconnected. Therefore, the scan control signals can disable the scan chain during functional mode.

8 Claims, 5 Drawing Sheets

SCAN CHAIN DISABLE FUNCTION FOR POWER SAVING

This application is a divisional of application Ser. No. 10/976,259, filed Oct. 28, 2004 now U.S. Pat. No. 7,165,006, status awaiting publication.

BACKGROUND OF THE INVENTION

1. Field of the Invention

The present invention relates generally to scan chains used in processors, and more particularly, to a design that will disable the scan chain during functional mode of the processor for power saving.

2. Description of the Related Art

Scan chains are used for testing and debugging microprocessors and other LSI chips. These scan chains can also be used for bringing up a chip during the initial boot up sequences. Once the testing or the initial boot up sequences are completed, the scan chains are no longer necessary for the functional operation of a processor. Although these scan chains do not have a functional purpose they are not removed from the processor or disconnected. Since these scan chains are kept connected, whenever the data of the functional paths change, the data change will propagate through the scan chains. This propagation results in the consumption of some unnecessary power.

Referring to FIG. 1 in the drawings, reference numeral 100 illustrates a block diagram depicting the conventional implementation of scan chains in a microprocessor. The latch bits 104, 112, 120, 130, 138, and 146 are connected to each other in the lateral direction. In a typical design, there is a scan chain segment 150 that bridges the scan output of one latch bit 138 and the scan input of another latch bit 146. The scan chain segment 150 and other scan chain segments (not labeled) consist of a long wire and two buffers 142 and 144. These scan chain segments exist between all of the latch bits in a processor containing a scan chain. Accordingly, if a scan signal travels from the output of latch bit 138 to the input of latch bit 146, it passes through buffers 142 and 144.

A trace of a scan signal through a scan chain must begin with the Scan In signal 102. This Scan In signal 102 enters the latch bit 104 as an input. Communication channel 106 feeds the output of latch bit 104 into buffer 108. Communication channel 106 denotes the scan output port of latch bit 104. Buffer 108 outputs the scan signal into the next buffer 110. Buffer 110 then distributes the signal as an input to latch bit 112. Communication channel 114 distributes the scan output signal from the output of latch bit 112 to buffer 116. This process will continue to repeat itself until the last latch bit in the scan chain has been scanned. In particular, in FIG. 1, buffer 116 outputs the scan signal into the next buffer 118, which then distributes the signal as an input to latch bit 120. The output of latch bit 120 is conveyed via communication channel 122 to the input of buffer 124, the output of which conveys the signal to the input of buffer 126. The signal is then conveyed from the output of buffer 126 to the input of latch bit 130. The output of latch bit 130 is conveyed via communication channel 132 to the input of buffer 134, the output of which conveys the signal to the input of buffer 136. The signal is then conveyed from the output of buffer 136 to the input of latch bit 138. The output of latch bit 138 is conveyed via communication channel 140 to the input of buffer 142, the output of which conveys the signal to the input of buffer 144. The signal is then conveyed from the output of buffer 144 to the input of latch bit 146. The last latch bit 146 produces the Scan Out signal 148. This is how a scan signal passes through a scan chain involving these latch bits. In functional mode of the processor these latch bits distribute information to each other through logic circuits, 152, 154, 156, and 158. For example, latch bit 104 will send information through logic circuit 152 to distribute a decoded signal to latch bit 120. During functional mode of a microprocessor these scan chains are unnecessary.

Referring to FIG. 2 of the drawings, reference numeral 200 depicts a block diagram of a conventional latch bit. The scan control signal 205 enables latch 1 220 to carry out a scan of the complete latch bit 200. In scan mode, the scan in port 210 is selected by the scan control signal 205 and provides the input to latch 1 bit 220. Latch 1 220 and latch 2 225 combined make up the latch bits that correspond to latch bits 104, 112, 120, 130, 138 and 146 in FIG. 1. The primary in port 215 is also an input to latch 1 220. This primary in port 215 is used during the functional mode of the processor. In the functional mode of the processor, the signal path is from primary in 215 to primary out 230. In the scan mode of the processor, the path is from scan in 210 to both the primary out 230 and the scan out 235. In this conventional latch bit, the primary out port 230 and the scan out port 235 are at the same node 240.

This conventional latch bit causes some problems. The primary out port 230 and the scan out port 235 are at the same node 240. Therefore, the scan out port 235 will toggle during the functional mode of the processor, and the data will propagate through the nets of the scan chain until the scan chain hits a latch bit where the primary in port 215 is selected. During functional mode, every latch bit will be selected for the primary in port 215. As shown in FIG. 1, the latch bits are bridged by a long wire and several buffers illustrated as scan chain segment 150 in FIG. 1. The toggling of these wires and buffers during primary signal distribution leads to unnecessary power consumption. Therefore, there is a need for a method and/or apparatus to modify conventional scan chains to consume less energy during the functional mode of a processor.

SUMMARY OF THE INVENTION

The present invention provides a method, an apparatus, and a computer program for the conservation of energy during functional mode of a processor. This is accomplished by disabling the scan chains during functional mode. Logic gating is inserted into every latch bit in a scan chain or into every register in a scan chain. A scan disable signal and the scan out signal of a latch bit are the inputs of the logic gating and a time delayed scan out signal is the output. The logic gating will disable the scan chain during functional mode of the processor and enable the scan chain during scan mode. Conventional scan chains do not disable the scan chain during functional mode, and therefore, data changes propagate through the scan chains. By disabling the scan chain during functional mode, data will not propagate through the scan chain and energy is conserved.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

Figure 1:
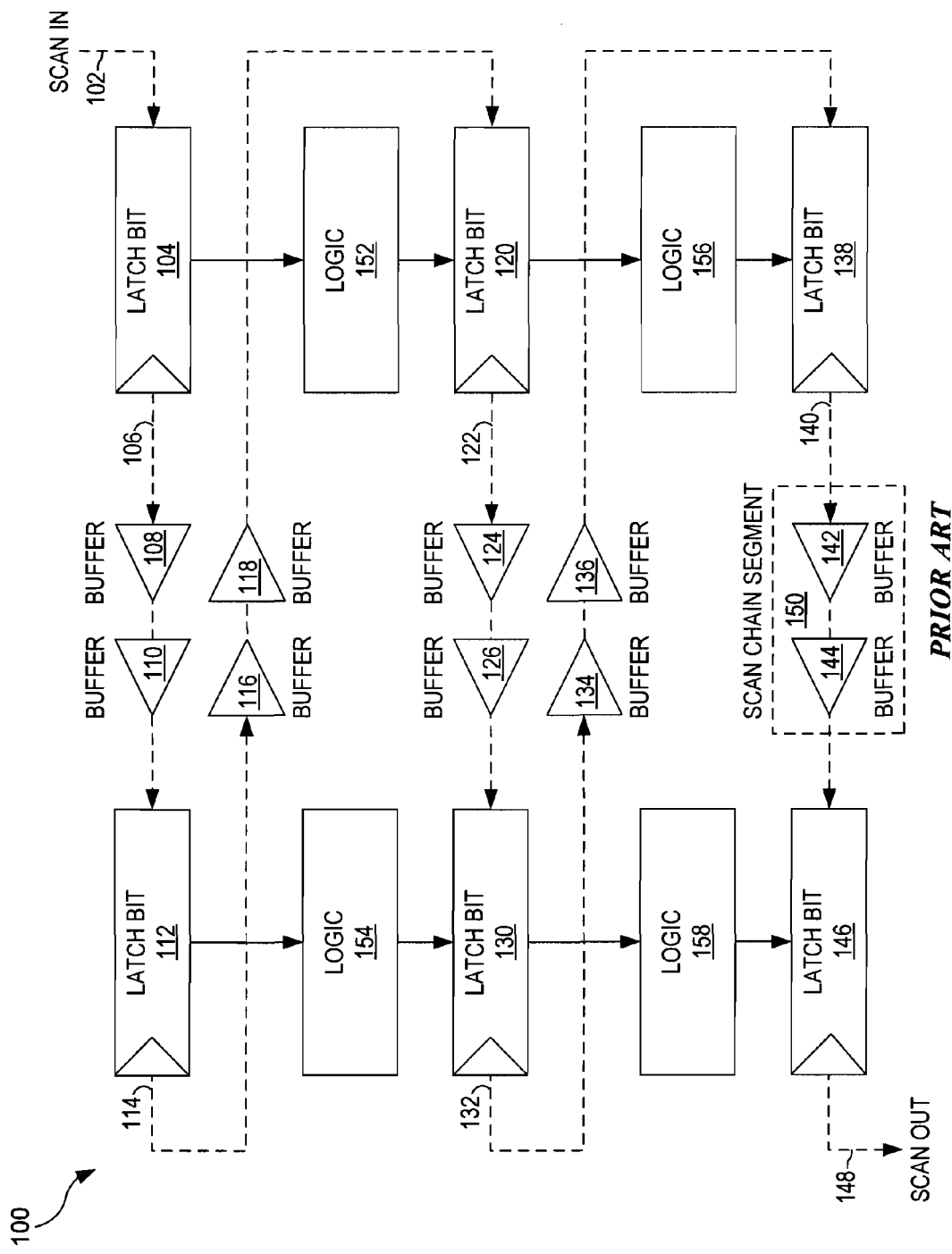
FIG. 1 schematically depicts the conventional implementation of a scan chain in a processor.
Figure 2:
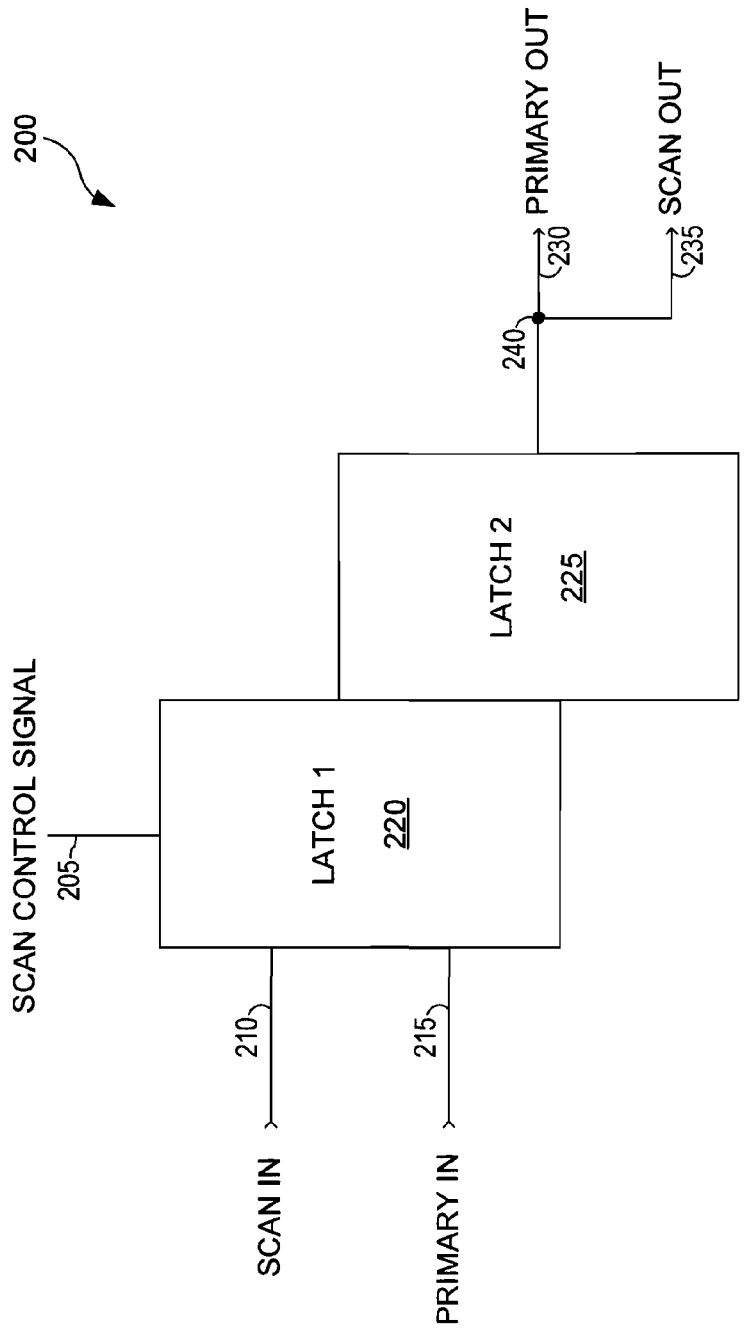
FIG. 2 schematically depicts a conventional latch bit in a processor.
Figure 3:
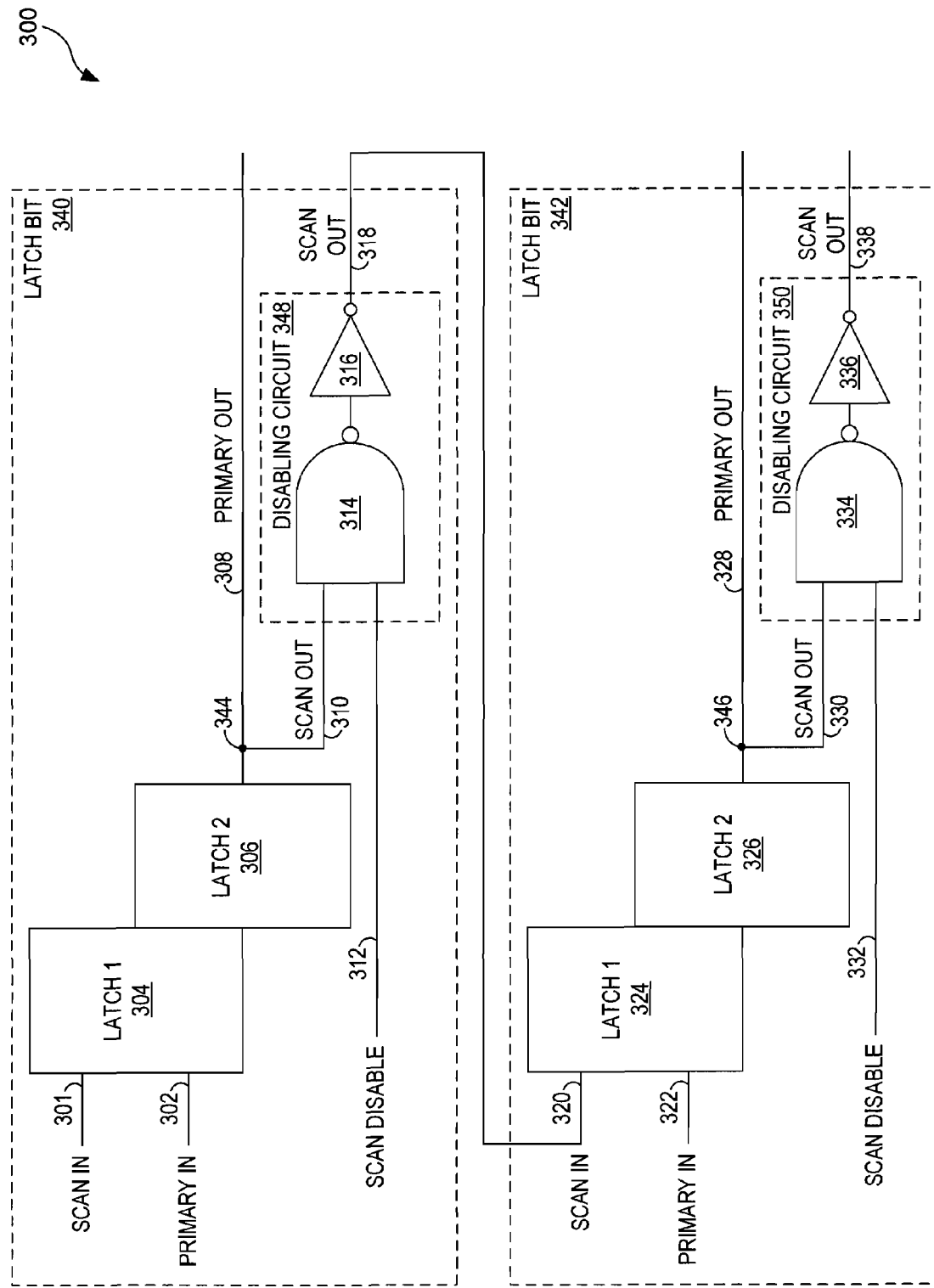
FIG. 3 schematically depicts a modified latch bit, wherein the scan out port of every latch bit is gated with a scan disable signal.

This invention disables the scan chains after their usage has been completed in order to prevent the toggling of the scan output port. Disabling these scan chains reduces the unnecessary power consumption of the scan chains during the functional mode of a processor. Referring to FIG. 3 of the drawings, reference numeral 300 depicts a scan chain design illustrating the logic gating of the scan out port of every latch bit in a scan chain. Scan in port 301 and primary in port 302 are the inputs of latch bit 340. During scan mode the scan in port 301 is selected, and during functional mode the primary in port 302 is selected. Latch 1 304 and latch 2 306 correspond to the conventional latch bit 200 in FIG. 2. The output of latch 2 306 is the primary out port 308 and the scan out port 310. As previously discussed, the node 344 contains both, the primary out port 308 and the scan out port 310.

In this design the scan output port 310 provides an input to NAND gate 314. The scan disable signal 312 provides the other input of NAND gate 314. The output of NAND gate 314 is fed into an inverter 316. The NAND gate 314 and the inverter 316 make up the disabling circuit 348. The output of this inverter 316 provides the scan out signal 318. The two latches 304 and 306 and the logic gating make up the latch bit 340. The scan out signal 318 is connected to the scan in port 320 of the next latch bit 342 in the array. This identical process continues inside of latch bit 342, wherein scan in port 320 and primary in port 322 are the inputs, latch 1 324 and latch 2 326 correspond to convention latch bit 200 of FIG. 2, the output of latch 2 326 is primary out port 328 and scan out port 330, both of which are contained in node 346, scan out port 330 provides one input into a disabling circuit 350, a scan disable signal 312 provides the other input into disabling circuit 350, scan out signal 330 and scan disable signal 312 feed NAND gate 334, the output of which feeds an inverter 336. Latch bit 342 produces, from the output of inverter 336, a scan out signal 338 that is connected to the scan in port of the next latch bit.

Figure 4:
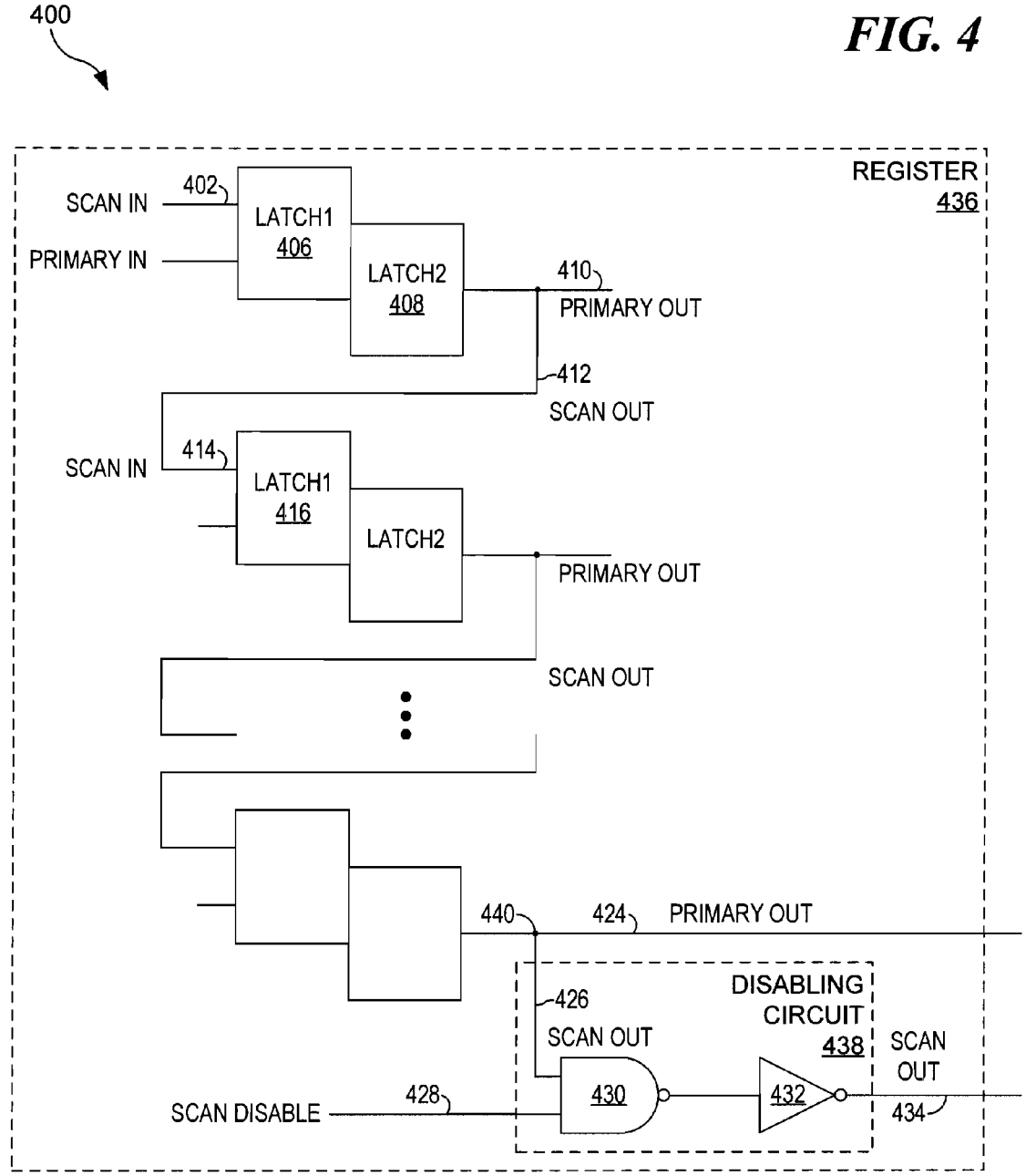
FIG. 4 schematically depicts a modified latch bit register, wherein the scan out port of the register is gated with a scan disable signal.

Referring to FIG. 4 of the drawings, reference numeral 400, depicts an alternative scan chain design illustrating the logic gating of the scan output port of an array of latch bits in a register. Register 436 contains an array of latch bits. The scan in signal 402 is the scan input of latch 1 406. As previously described, latch 1 406 and latch 2 408 correspond to a conventional latch bit depicted by reference numeral 200 in FIG. 2. The scan out port 412 and the primary out port 410 are the outputs of this latch bit. The scan out port 412 is connected to the scan in port 414 for latch 1 416. This process repeats itself for the complete array of latch bits in the register 436. The output of the last latch bit in the register produces the primary out port 424 along with the scan out port 426. Accordingly, these two ports exist at the same node 440. The scan out port 426 is one of the inputs for NAND gate 430. The other input for NAND gate 430 is the scan disable signal 428. The output of NAND gate 430 is connected to the input of inverter 432. The output of inverter 432 is the scan out signal 434 of the register 436 that contains an array of latch bits. The NAND gate 430 and the inverter 432 make up the disabling circuit 438.

FIG. 3 and FIG. 4 are similar designs. FIG. 3 illustrates logic gating of the scan output signal in every latch bit. FIG. 4 depicts gating the scan output signal of the register. Both figures are designed to disable the scan chain and prevent the toggling of wires and buffers between latch bits. By inserting this gating logic the connectivity of the scan chains can be controlled. The scan disable signals 312, 332, and 428, the NAND gates 314, 334, and 430 and the inverters 316, 336, and 432 disconnect the scan chain and prevent the scan output ports of the latch bits from toggling during functional mode. In FIG. 3 and FIG. 4 NAND gates 314, 334, and 430 and inverters 316, 336, and 432 are used, but with the right implementation other gates can be used. For example, a NOR gate combined with an inverter can accomplish the same result. The designs illustrated in FIG. 3 and FIG. 4 can be utilized by setting the scan disable signals 312, 332, and 428 (DC signals) to a "0" or a "1." If the scan disable signal is a "0," then the scan chain is disabled. By setting the scan disable signal to "1" the scan chain is able to proceed. This implementation prevents undesirable power consumption during the functional mode of a processor.

Additionally, both implementations (FIG. 3 and FIG. 4) can be used to initialize the contents of an array of latch bits. In FIG. 3, setting the scan disable signals 312 and 332 to be "0" will initialize latch bits 340 and 342 to be "0" after one clock cycle. In FIG. 4, setting the scan disable signal 428 to "0" will initialize all of the latch bits in the register 436 to be "0" after multiple clock cycles. Therefore, the design in FIG. 3 allows the latch bits to be initialized much faster than the design in FIG. 4. The drawback is that implementing logic gating in every latch bit will occupy more area on the chip.

Figure 5:
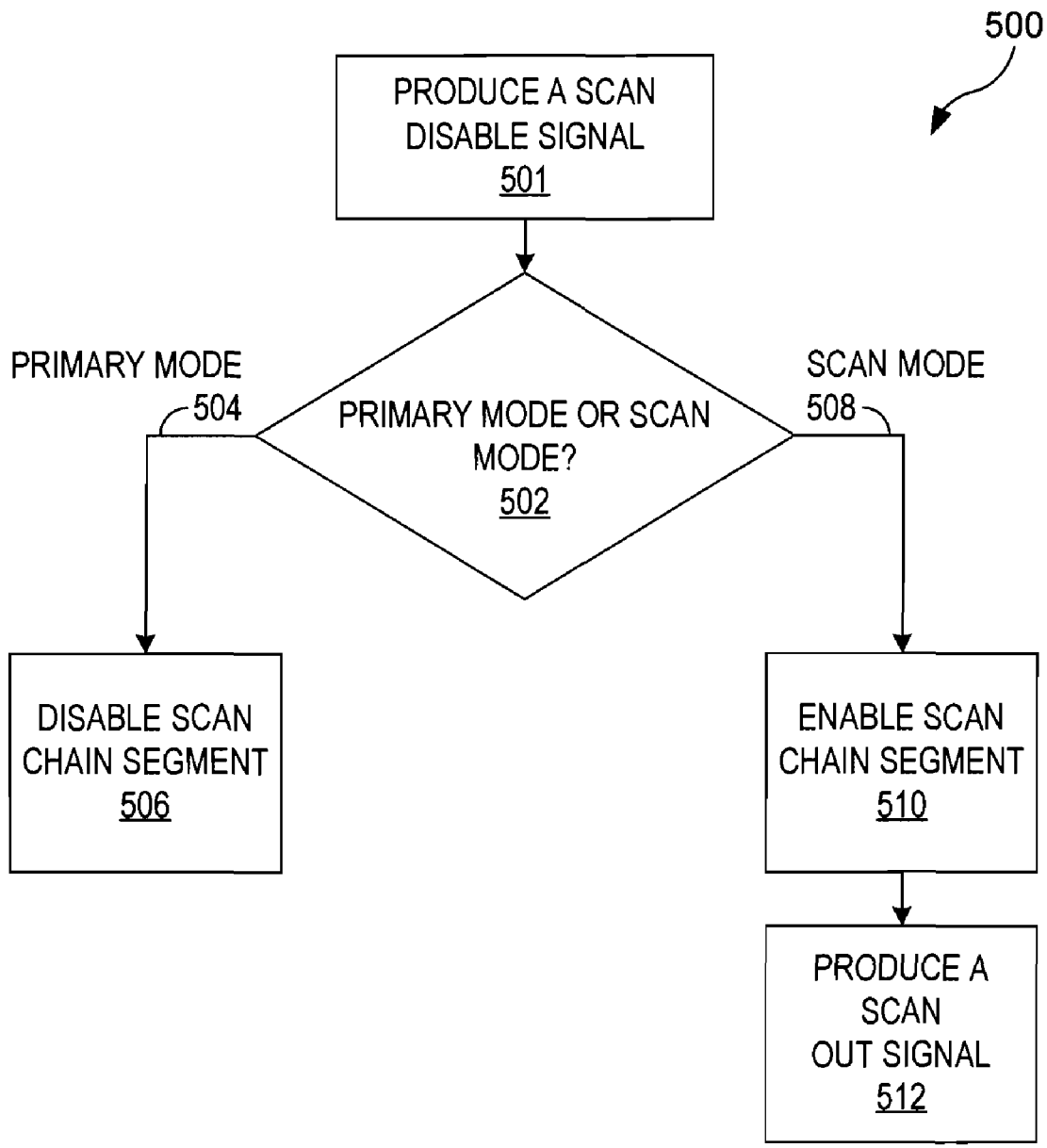
FIG. 5 depicts a flow chart illustrating the process by which a disabling circuit can disable a scan chain.

Referring to FIG. 5 of the drawings, reference numeral 500 generally indicates a flow chart illustrating the process by which a scan disable signal can disable a scan chain segment. The process begins in step 501, producing a scan disable signal as indicated by reference numerals 312, 332 (FIG. 3), and 428 (FIG. 4). In step 502, the scan disable signal and the disabling circuits 348, 350 (FIG. 3) and 438 (FIG. 4) determine whether the scan chain is enabled or disabled. Referring to the logic circuit implementation of FIG. 3 and FIG. 4, if the scan disable signals 312, 332, and 428 are a logical "0" then the scan chain is disabled. Accordingly, if the scan disable signals 312, 332, and 428 are a logical "1" then the scan chain is able to proceed. In primary mode 504, the scan disable signal is a "0" and the scan chain segment 150 is disabled in step 506. In scan mode 508, the scan disable signal is a "1" and the scan chain segment 150 is enabled in step 510. When the scan chain is enabled, then in step 512 the logic circuit produces a scan out signal, which is indicated by reference numerals 318, 338 and 434. This scan out signal provides the scan in signal for the next latch bit or the next register in the scan chain.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for disabling a scan chain function for power saving in a processor, comprising:
   inserting gates in the scan chain;
   generating scan chain control signals delivered to the gates; and
   controlling connectivity of the scan chain with the control signals during functional mode of the processor, wherein:
   inserting gates in the scan chain further comprises inserting the gates at the scan out port of a final latch bit of an array of latch bits inside a register of the scan chain, gates are not inserted at the scan out ports of latch bits in the array of latch bits that are positioned prior to the final latch bit in the array of latch bits of the scan chain, and
   controlling the connectivity of the scan chain with the control signals during functional mode of the processor further comprises:
      producing control signals that will disable the scan chain during a primary mode of the processor; and
      producing control signals that will enable the scan chain during a scan mode of the processor.

2. A computer program product for disabling a scan chain function for power saving in a processor, with the computer program product having storage device with a computer program embodied thereon, wherein the computer program comprises:
   computer code for inserting gates in the scan chain;
   computer code for generating scan chain control signals delivered to the gates; and
   computer code for controlling connectivity of the scan chain with the control signals during functional mode of the processor, wherein:
   the computer code for inserting gates in the scan chain inserts the gates at the scan out port of a final latch bit of an array of latch bits inside a register of the scan chain, gates are not inserted at the scan out ports of latch bits in the array of latch bits that are positioned prior to the final latch bit in the array of latch bits of the scan chain~and
   the computer code for controlling the connectivity of the scan chain with the control signals during functional mode of the processor comprises:
   computer code for producing control signals that will disable the scan chain during a primary mode of the processor; and
   computer code for producing control signals that will enable the scan chain during a scan mode of the processor.

3. A method for disabling a scan chain function in a processor, comprising:
   generating a scan disable control signal;
   providing the scan chain control signals to at least one scan chain of a processor; and
   controlling the at least one scan chain based on the scan disable control signal during functional mode of the processor so as to disable operation of the at least one scan chain when the processor is operating in functional mode, wherein:
   the at least one scan chain comprises a plurality of latches,
   a final latch in the at least one scan chain has an associated disabling circuit that disables an operation of the final latch in response to receiving the scan disable control signal, and
   other latches in the plurality of latches that are positioned prior to the final latch in the scan chain do not have disabling circuits associated with them.

4. The method of claim 3, wherein the disabling circuit comprises at least one gate at a scan out port of a final latch, and wherein the at least one gate operates in response to receiving the scan disable control signal to prevent toggling of an output port of the final latch when the processor is in a functional mode of operation.

5. The method of claim 4, wherein the at least one gate comprises a NAND gate and an inverter coupled to the NAND gate, wherein the NAND gate receives the scan disable control signal as an input and outputs a scan output signal to the inverter.

6. A computer program product for disabling a scan chain function in a processor, the computer program product having storage device with a computer program embodied thereon, wherein the computer program comprises instructions for:
   generating a scan disable control signal;
   providing the scan chain control signals to at least one scan chain of a processor; and
   controlling the at least one scan chain based on the scan disable control signal during functional mode of the processor so as to disable operation of the at least one scan chain when the processor is operating in functional mode, wherein:
   the at least one scan chain comprises a plurality of latches,
   a final latch in the at least one scan chain has an associated disabling circuit that disables an operation of the final latch in response to receiving the scan disable control signal, and
   other latches in the plurality of latches that are positioned prior to the final latch in the scan chain do not have disabling circuits associated with them.

7. The computer program product of claim 6, wherein the disabling circuit comprises at least one gate at a scan out port of a final latch, and wherein the at least one gate operates in response to receiving the scan disable control signal to prevent toggling of an output port of the final latch when the processor is in a functional mode of operation.

8. The computer program product of claim 7, wherein the at least one gate comprises a NAND gate and an inverter coupled to the NAND gate, wherein the NAND gate receives the scan disable control signal as an input and outputs a scan output signal to the inverter.

* * * * *